United States Patent
Johnston

(10) Patent No.: US 10,852,280 B1
(45) Date of Patent: Dec. 1, 2020

(54) HELIUM RECLAMATION AND RECYCLING FILTRATION SYSTEM AND METHOD FOR ANALYTICAL INSTRUMENTATION

(71) Applicant: Patrick Allan Johnston, Boone, IA (US)

(72) Inventor: Patrick Allan Johnston, Boone, IA (US)

(73) Assignee: Patrick Allan Johnston, Boone, IA (US)

(*) Notice: Subject to any disclaimer, the term of this patent is extended or adjusted under 35 U.S.C. 154(b) by 201 days.

(21) Appl. No.: 15/966,647

(22) Filed: Apr. 30, 2018

Related U.S. Application Data

(60) Provisional application No. 62/491,719, filed on Apr. 28, 2017.

(51) Int. Cl.
| | | |
|---|---|---|
| *B01D 53/02* | (2006.01) | |
| *G01N 30/80* | (2006.01) | |
| *G01N 30/32* | (2006.01) | |
| *G01N 30/60* | (2006.01) | |
| *G01N 30/02* | (2006.01) | |

(52) U.S. Cl.
CPC .......... *G01N 30/80* (2013.01); *G01N 30/32* (2013.01); *G01N 30/6073* (2013.01); *G01N 2030/025* (2013.01); *G01N 2030/324* (2013.01); *G01N 2030/326* (2013.01); *G01N 2030/328* (2013.01)

(58) Field of Classification Search
CPC .... G01N 30/80; G01N 30/32; G01N 30/6073; G01N 2030/025; G01N 2030/324; G01N 2030/326; G01N 2030/328
See application file for complete search history.

(56) References Cited

U.S. PATENT DOCUMENTS

| | | | | |
|---|---|---|---|---|
| 3,964,866 A | * | 6/1976 | Shelby | .......................... 422/243 |
| 4,230,464 A | * | 10/1980 | Bonmati | ................ G01N 30/44 95/22 |
| 5,545,252 A | * | 8/1996 | Hinshaw | ................ G01N 30/32 73/23.25 |
| 6,074,461 A | * | 6/2000 | Wilson | ................... G01N 30/28 96/102 |
| 2011/0138877 A1 | * | 6/2011 | McCauley | ........... B01D 53/053 73/23.37 |
| 2013/0149226 A1 | * | 6/2013 | Song | .......................... F25J 3/08 423/262 |

(Continued)

*Primary Examiner* — Christopher P Jones
(74) *Attorney, Agent, or Firm* — Brick Gentry PC; Brian J. Laurenzo; Jessica L. Susie

(57) ABSTRACT

An apparatus and method for reclaiming and filtering helium for reuse in analytical instruments. The method includes inputting the output gas stream from a gas chromatograph split vent and subjecting the input gas stream to a mini-particulate filter. The gas stream is also subjected to a molecular sieve filter and a finishing filter to isolate the helium carrier gas. The finishing filter removes trace contaminants that are not caught in the previous filters. The method utilizes a pump and controller to maintain a constant pressure, preferably between 80 and 100 psi, to avoid back-flow contamination and to ensure movement of the gas stream through the filters. Additionally, the use of a relief valve prevents back pressure from entering into the gas chromatograph. The filtered helium gas may be stored for future use or re-introduced directly to the input carrier gas stream of a gas chromatograph.

20 Claims, 7 Drawing Sheets

(56) References Cited

U.S. PATENT DOCUMENTS

2016/0045841 A1* 2/2016 Kaplan ............... C01B 32/21
 429/49
2017/0038347 A1* 2/2017 Tipler ............... G01N 30/32
2017/0341018 A1* 11/2017 She ............... B01D 53/30

* cited by examiner

HELIUM RECLAMATION AND RECYCLING FILTRATION SYSTEM AND METHOD FOR ANALYTICAL INSTRUMENTATION

CROSS REFERENCE TO RELATED APPLICATION

This application claims priority from U.S. Provisional Application Ser. No. 62/491,719 filed Apr. 28, 2017 and entitled HELIUM RECLAMATION AND RECYCLING FILTRATION SYSTEM FOR ANALYTICAL INSTRUMENTATION. The content of U.S. Provisional Application Ser. No. 62/491,719 is hereby incorporated in its entirety by reference.

FIELD OF THE INVENTION

The present invention relates generally to the recycling and reclamation of helium from a gas chromatograph. More specifically, the present invention relates to an apparatus and methods of recycling helium from a split vent of a gas chromatograph wherein the gas stream from a split vent is successively filtered, pressurized, and/or stored or input back into the gas chromatograph directly.

BACKGROUND

Helium has become a finite resource and may eventfully become nonexistent. Many researchers and laboratories around the world use helium in significant quantities as a carrier gas in gas chromatography instruments. Many gas chromatography instruments utilize a split vent that results in significant loss of the helium carrier gas. A typical gas chromatography instrument could possibly lose 99% of the helium gas introduced into the gas chromatography instrument to laboratory atmosphere during a test. While this is dependent on the split ratio of the instrument, it is typical for many gas chromatography instruments to be operated with a 100:1 split ratio. This means that a gas chromatograph operating under a 100:1 split ratio releases 100 times the amount of gas needed to carry the sample for analysis into the atmosphere.

The split ratio of a gas chromatography instrument is readily attainable with two pieces of information, the flow rate of the split vent 210 and the flow rate of the column 212. The ratio is simply the flow rate of the column 212 divided by the flow rate of the split vent 210. For example, a split vent that has a flow rate of 100 ml/min and a column flow rate of 1 ml/min has a split ratio of 100:1 as provided by the calculation below.

$$\frac{\text{split vent flow}}{\text{column flow}} = \frac{100}{1.00} = 100$$

According to the Helium Stewardship Act of 2013, helium reserves will close by 2021. Since helium is a finite resource, it will become virtually nonexistent for laboratory use once the resource is severely depleted or exhausted. Global helium consumption in 2015 shows 20% of all helium was utilized by MRI/NMR instruments, while 15% of all helium use was utilized by analytical and specialty gases, including gas chromatography and mass spectrometry. Global helium consumption in 2015 was 168 million m$^3$ which means 25.2 million m$^3$ was used by analytical instruments such as gas chromatography instruments in 2015 alone.

Previous systems and methods of helium recycling or purification utilize getter apparatuses that are typically heated or a packed bed trap design or a polymer filter that is permeable only to helium. However, these purification methods can still leave trace contaminants that will affect the results of analytical instruments such as gas chromatographs or could damage those instruments outright. Moreover, other methods of purification utilize heaters and condensers to separate helium from condensed products. However, other non-condensed contaminants may remain in the gas stream.

For example. U.S. Pat. No. 6,074,461 to Wilson ("Wilson") describes a gas chromatograph having a recycling system. Wilson discloses the use of a helium getter, packed bed trap design, or polymer that allows only helium to pass through. However, this single-step purification process can leave large impurities in the gas stream, especially if the purification method is not operating properly. For example, if a polymer purification method is used, but the polymer has been compromised in any way, then the purification process of Wilson would not output purified helium, which, in turn, would damage the gas chromatograph.

In another example, U.S. Pat. No. 4,230,464 to Bonmati et al. ("Bonmati") discloses a method for recycling carrier gas from the trapping system to the inlet of a gas chromatograph. Bonmati discloses the use of a pre-purification step involving compressing the input gas stream, passing said gas stream over a heat exchanger, and then condensing the gas through a condenser to separate the condensate from the carrier gas. The design of Bonmati further requires a portion of the pre-purified gas to be fed back to the suction system removing gas from the gas chromatograph trapping system into the recycling apparatus of Bonmati. Bonmati specifically discloses the use of this partial feedback loop in order to maintain the carrier gas flow rate into the recycling apparatus of Bonmati. Accordingly, the efficiency of the Bonmati method is reduced. The pre-purification step of Bonmati relies primarily on heating the gas stream during the compression of the gas stream and then quickly cooling the gas stream down with the heat exchangers to allow condensate to separate from the carrier gas.

The remaining gas stream of Bonmati may then be returned to the inlet of a gas chromatograph after undertaking a purification step involving activated carbon or a molecular sieve filter. However, trace contaminants can still exist after the purification steps described in Bonmati. Additionally, as mentioned above, only a portion of the input gas stream into the recycling apparatus makes it back to the inlet of the gas chromatograph, thus reducing the efficiency of the invention.

None of the known methods or apparatuses provides an efficient recycling of helium carrier gas. Additionally, none of the known methods or apparatuses include redundant filtering to remove trace contaminants to ensure the purity of the helium output gas. This is a key differentiator as analytical testing instruments are highly susceptible to even trace contaminants which can alter the results of the instrument or outright damage the gas chromatograph.

Accordingly, there exists a need in the art for a method and/or apparatus to efficiently purify helium carrier gas for reuse. The method and/or apparatus should remove all contaminants from a split vent output of a gas chromatograph so that the purified gas may be re-utilized in the gas chromatograph. Additionally, the method and/or apparatus should efficiently process the split vent output to minimize the gas lost within the recycling method and/or apparatus or lost to the atmosphere. Such a method and/or apparatus should be able to easily integrate into an existing gas chromatograph split vent output.

SUMMARY

The present invention provides a system and method to recycle helium from a split vent of an analytical instrument such as a gas chromatograph back into the input carrier gas stream of the analytical instrument. A split vent typically vents 80 to 100 times the amount of carrier gas utilized the analytical instrument resulting in high levels of carrier gas waste. As a helium carrier gas is a finite resource, the system and method of the present invention captures contaminated helium gas from the split vent of a gas chromatograph and transports the contaminated gas via a plurality of tubing. The system and method of the present invention thereafter subjects the contaminated gas to a multi-step filtration system while maintaining the recycling system under a constant pressure level by utilizing a pump selectively activated and deactivated by a pressure/flow controller. The pressurization of the system maintains a constant flow rate of the contaminated gas through the recycling system. The preferred pressure level range utilized by the recycling system is 80 to 100 psi. The recycling system may further include a pressure relief valve to vent excess pressure or contaminated gas in emergency situations to prevent pressure from the system to travel into the gas chromatograph or reach excessive levels within the system.

The multi-step filtration system of the preferred embodiment comprises a mini particulate filter, a molecular sieve filter, and a finishing filter. The mini particulate filter of the preferred embodiment utilizes a substantially clear collection trap to allow a user to determine when the collection trap requires cleaning. Additionally, the molecular sieve filter of the preferred embodiment comprises end caps on the ends of the filter to allow a user to more readily replace a saturated filter. Similarly, the finishing filter of the preferred embodiment utilizes color-changing indicator beads to allow a user to determine when the finishing filter is saturated and requires replacement. It is essential that the filters are cleaned or replaced when saturated so that the filters do not reduce or lose the ability to remove contaminants from the contaminated gas stream.

The mini particulate filter of the preferred embodiment utilizes a filtration method to remove water, hydrocarbons, and/or volatile aromatic compounds. The molecular sieve filter of the preferred embodiment utilizes 3 and/or 4 angstrom sized pores to remove non-condensable and/or permanent gases such as oxygen, nitrogen, carbon monoxide, and/or carbon dioxide. The finishing filter of the preferred embodiment removes trace contaminants from the contaminated gas stream by utilizing a molecular sieve filter, an activated alumina filter, an activated carbon filter, and/or a zinc oxide filter. The finishing filter of the preferred embodiment removes trace contaminants such as oxygen, water, carbon monoxide, carbon dioxide, sulfur, halogens, alcohols, and/or phenols resulting in a pure helium output gas stream. The resulting pure helium output gas can be reintroduced to the input carrier gas stream of a gas chromatograph by being transported via the plurality of tubing into the aforementioned input carrier gas stream of a gas chromatograph. Alternatively, the pure helium output gas may be stored in a storage medium, such as a pressure-rated storage cylinder, for later use. The relief valve of the recycling system ensures that pressure from the recycling system is not pushed back into the gas chromatograph input gas stream causing damage to the gas chromatograph.

Accordingly, the present invention decreases the loss of helium gas from at least a split vent of a gas chromatograph during typical operations. Furthermore, the present invention allows the reclamation or recycling of all captured contaminated gas from a split vent without losing any contaminated or filtered helium within the recycling apparatus itself. Additionally, the multi-step filtration system of the present invention ensures the purity of the helium output gas so that it may be safely reused in a gas chromatograph without fear of damaging the sensitive analytical instrument or altering the results of testing conducted through the analytical instrument.

DETAILED DESCRIPTION

Figure 1:
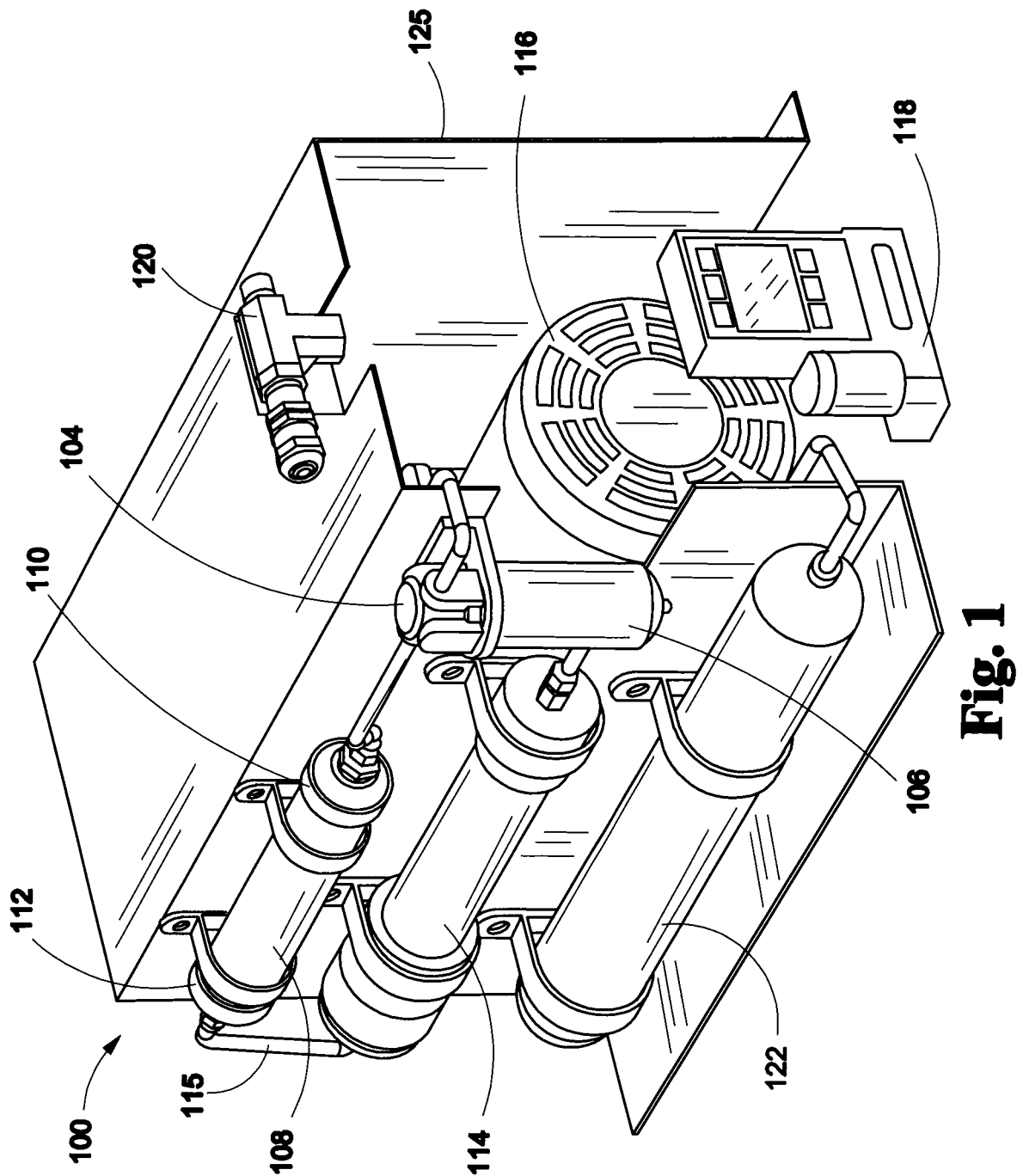
FIG. 1 is a perspective view of the helium reclamation system according to the preferred embodiment of the present invention.

The following is a detailed description of a helium reclamation and recycling filtration system 100 and method 102 for analytical instrumentation. For ease of discussion and understanding the filtration system of the preferred embodiment utilizes multiple filters referred to as a mini particulate filter 104, a molecular sieve filter 108, and a finishing filter 114. It will be understood by one skilled in the art that the function of the filters 104, 108, and 114 may be carried out by filtration technologies other than those specifically disclosed herein to obtain a similar or identical result. Accordingly, the following detailed description and associated figures should not be read as limiting.

The helium recycling system 100 and method 102 of the present invention aids in reducing consumption of the finite resource, helium gas. Referring to FIG. 1, shown is a perspective view of the preferred embodiment of the present invention. The preferred embodiment of the helium reclamation and recycling filtration system (sometimes referred to as "recycling system" or "system"), 100, utilizes the contaminated output gas stream 103 from a split vent 210 of a gas chromatograph 200 as an input gas stream. However, it should be appreciated by one skilled in the art that other contaminated gas streams containing helium may be utilized as the input gas stream of the recycling system 100 without departing from the scope of the present invention. The contaminated gas stream 103 is transported via a plurality of tubing 115 through the recycling system 100 of the present invention. The contaminated gas 103 is transported through a multi-step filtration system utilizing a mini particulate filter 104, a molecular sieve filter 108, and/or a finishing filter 114. It should be appreciated by one skilled in the art that other filtering technologies may be utilized without departing from the scope of the present invention. Prior to multi-step filtration system, the system 100 of the preferred embodiment utilizes a pressure/flow controller 118 and relief valve 120 to assist in pressurizing 119 the system 100 and maintaining a consistent pressure as discussed in greater detail below.

As depicted in FIG. 1, the mini particulate filter 104 of the preferred embodiment of the present invention utilizes a glass collection chamber 106. It should be appreciated that other materials may be utilized for the collection chamber 106 of the mini particulate filter 104, without departing from the scope of the present invention. A glass collection chamber 106 allows a user of the system 100 to easily identify when the collection chamber 106 requires cleaning to maintain the functionality of the mini particulate filter 104. The mini particulate filter 104 of the preferred embodiment comprises filtration member to remove water, hydrocarbons, and/or other aromatic compounds. It should be appreciated by one skilled in the art that any filtration technology that removes the aforementioned water, hydrocarbons, volatile aromatic compounds, and similar contaminants in sufficient quantities may be utilized without departing from the scope of the present invention.

According to the preferred embodiment of the present invention, the contaminated gas 103 is also treated through a molecular sieve filter 108. The molecular sieve filter 108 of the preferred embodiment consists of 3 and 4 angstrom pores (4-8 mesh) that removes most of the non-condensable and permanent gas contaminants in the contaminated gas stream 103. These contaminants include oxygen, nitrogen, carbon monoxide, water, methane, and/or carbon dioxide. However, it should be appreciated by one skilled in the art that any filtration technology that removes the aforementioned oxygen, nitrogen, carbon monoxide, carbon dioxide, water, methane, and similar contaminants in sufficient quantities may be utilized without departing from the scope of the present invention. The molecular sieve filter 108 of the preferred embodiment further comprises a first and second end cap 110 and 112. The end caps 110 and 112 allow a user to easily remove old filter particles and contaminants and refile the molecular sieve filter 108.

As provided in FIG. 1, according to the preferred embodiment of the present invention, the contaminated gas 103 is also treated through a finishing filter 114. The finishing filter 114 of the preferred embodiment removes a wide variety of trace contaminants that include oxygen, water, carbon monoxide, carbon dioxide, sulfurs, halogens, alcohols, and phenols. The finishing filter 114 of the preferred embodiment comprises molecular sieves, activated alumina, activated carbon, and/or zinc oxide. However, it should be appreciated by one skilled in the art that any filtration technology that removes a wide variety of trace contaminants in sufficient quantities may be utilized without departing from the scope of the present invention. The finishing filter 114 is a key improvement over traditional helium recycling systems since it is designed to target and remove any remaining contaminants from the gas stream to produce a pure helium output 123 that may be reused with gas chromatographs 200 or stored for later use. The finishing filter 114 has the lowest capacity for holding contaminants so it is essential that the contaminated gas 103 passes through previous mini particulate filter 104 and molecular sieve filter 108 first and that the mini particulate filter 104 and the molecular sieve filter 108 are maintained and cleared properly so that they continue to operate efficiently to remove the bulk of the contaminants and particulates from the contaminated gas stream 103.

Also depicted in FIG. 1, and mentioned above, the preferred embodiment of the present invention includes a pressure/flow controller 118 and pump 116 to pressurize 119 the system 100. The pressure/flow controller 118 of the preferred embodiment is located after the input contaminated gas stream 103 and relief valve 120 and before the first filter, the mini particulate filter 104, of the multi-step filtration system. However, it should be appreciated by one skilled in the art that the placement of the components of the system 100 may be modified without departing from the scope of the present invention. The pressurization ensures the filters 104, 108, and 114 function properly by maintaining a constant flow of the contaminated gas stream 103 through each filter 104, 108, and 114. The preferred embodiment of the present invention utilizes a pressure at 80 to 100 psi. However, it should be appreciated by one skilled in the art that any gas flow technology, pressurization technique, and/or suitable pressure level may be utilized to move the contaminated gas stream 103 through the system 100 without departing from the scope of the present invention. The pressure/flow controller 118 of the preferred embodiment of the present invention selectively activates and deactivates the pump 116 to maintain the desired pressure level and flow rate of the contaminated gas 103 through the system 100.

Additionally, a relief valve 120 is provided in the preferred embodiment of the present invention. The relief valve 120 of the preferred embodiment of the system 100 is the first component the contaminated gas stream 103 passes through via a plurality of tubing 115. Thereafter, as discussed above, the contaminated gas 103 passes through the pressure/flow controller 118 before entering the multi-step filtration system which successively treats the contaminated gas 103 with a mini particulate filter 104, then a molecular sieve filter 108, and finally, a finishing filter 114. After the multi-step filtration system, the filtered helium output gas 123 is run through a pump or blower 116 that works in conjunction with the pressure/flow controller 118 to maintain the constant pressurization 119 of the preferred embodiment of the system 100. It should be appreciated by one skilled in the art that the components of the system 100 may be arranged in any configuration without departing from the scope of the present invention.

The relief valve 120 acts as a safety check to ensure that pressure from the system 100 does not back flow into the gas chromatograph 200, as this can severely damage the gas chromatograph 200. Moreover, the relief valve 120 will also activate if the pressure within the system 100 increases beyond the desired range. If activated, the relief valve 120 will vent gas and pressure within the system 100 into the atmosphere to avoid causing damage to the system or the gas chromatograph 200. However, it should be appreciated by one skilled in the art that any safety system or method may be utilized to prevent pressure back flow into the gas chromatograph 200 without departing from the scope of the present invention.

Optionally, as illustrated in FIG. 1, a pressure-rated storage cylinder 122 may be utilized with the system 100 to store the filtered helium output gas 123 if there is no need to run the helium output gas 123 back into the input stream of the gas chromatograph 200 directly. However, it should be appreciated by one skilled in the art that any storage medium 122 to store the helium output gas 123 may be utilized without departing from the scope of the present invention. The pressure-rated storage cylinder 122 of the preferred embodiment is located after the pump 116 but prior to the filtered helium output gas stream 123 exiting the system 100 and entering the input stream of the gas chromatograph 200. Again, it should be appreciated by one skilled in the art that any arrangement of the components of the system 100 may be utilized without departing from the scope of the present invention. All of the aforementioned components of the system 100 are mounted to a system enclosure casing 125 in order to efficiently hold and present each component for monitoring and maintenance. However, it should be appreciated by one skilled in the art that any mounting and/or presentation of the components of the system 100 may be utilized without departing from the scope of the invention.

Figure 2:
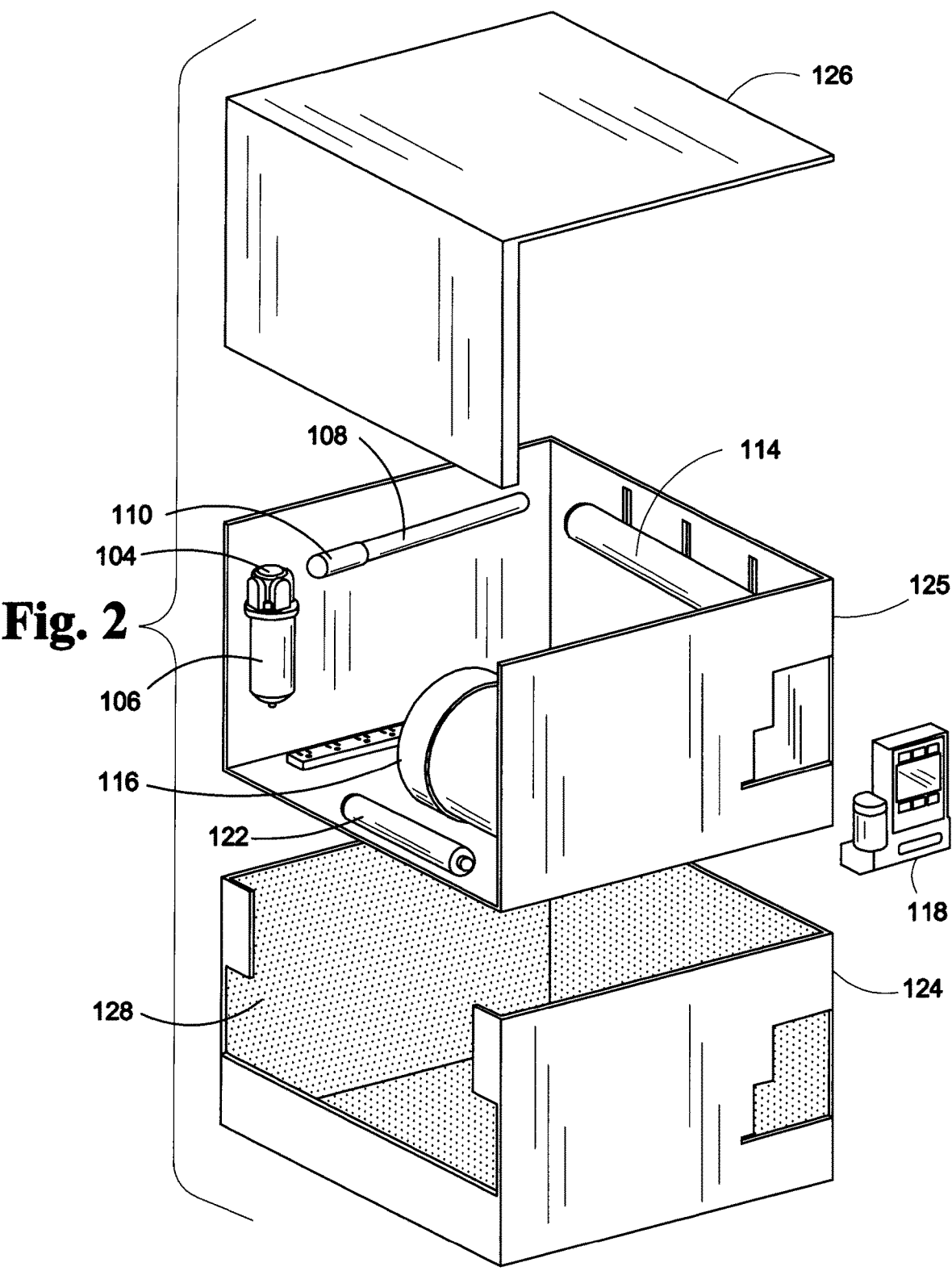
FIG. 2 is an exploded view of the helium reclamation system according to a first alternative embodiment of the present invention.

Looking to FIG. 2, provided is an exploded view of the first alternative embodiment of the present invention. As shown, the first alternative embodiment is mounted in an alternative enclosure and has a different component configuration. Specifically, as provided, each of the components of the system 100 are mounted in a system enclosure casing 125. The components as illustrated include the mini particulate filter 104 with its substantially clear collection chamber 106, the molecular sieve filter 108 with its removable end cap 110, the finishing filter 114, the pressure/flow controller 118, the pump 116, and the pressure-rated storage cylinder 122, as well as a power source to power the pump 116 and pressure/flow controller 118. The system enclosure case 125 is then held by a system outer casing 124 that is, ideally, lined with vibration dampening material 128. Also provided is an enclosure lid 126 which is also ideally lined with vibration dampening material 128 on the interior surface of the lid 126. However, it should be appreciated by one skilled in the art that the vibration dampening material 128 may be removed or altered without departing from the scope of the present invention. Additionally, it should be appreciated by one skilled in the art that the configuration and/or order of the components of the system 100 as described above may be rearranged without departing from the scope of the present invention.

Figure 3:
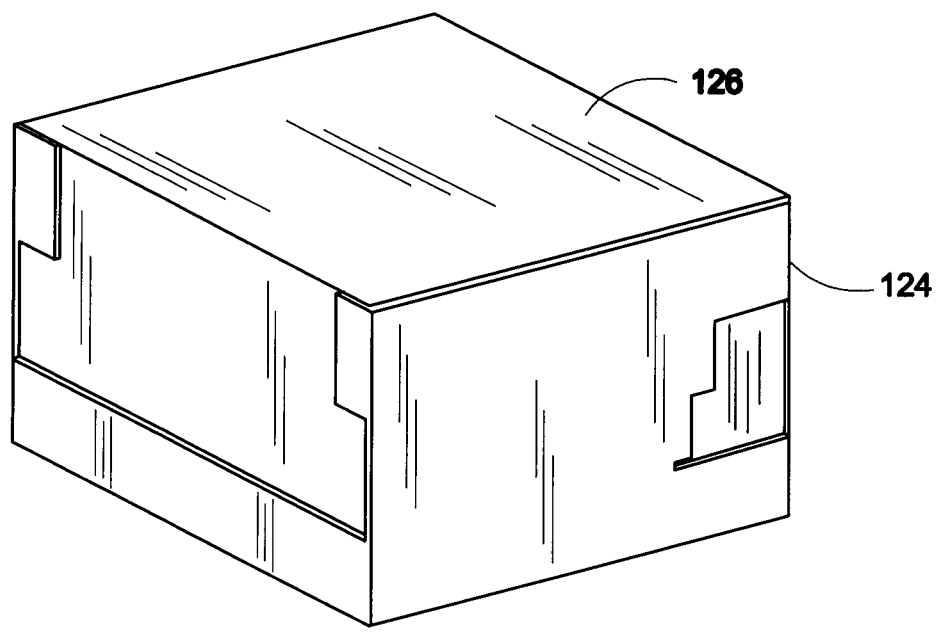
FIG. 3 is a perspective view of an enclosed helium reclamation system according to the first alternative embodiment of the present invention.
Figure 4A:
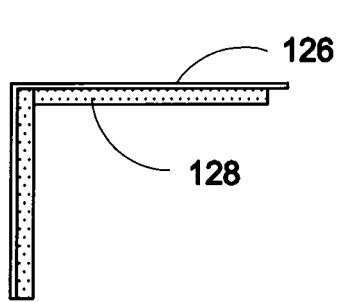
FIG. 4A is a side-view of a lid to enclose the helium reclamation system according to the first alternative embodiment of the present invention.
Figure 4B:
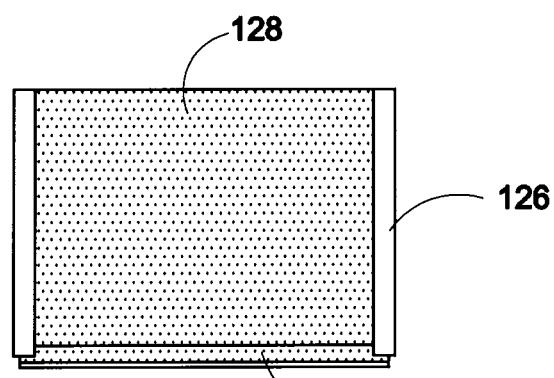
FIG. 4B is a top view of a lid to enclose the helium reclamation system according to the first alternative embodiment of the present invention.

As provided in FIG. 3, shown is the system 100 of the first alternative embodiment with the system enclosure fully assembled by holding the system enclosure case 125 in the system enclosure outer casing 124 and fixing the lid 126 to the outer casing 124, allowing the recycling system 100 to operate as a self-contained unit. As depicted in FIG. 3, a cutout is also included to allow a user to view and control the pressure/flow controller 118 without requiring the user to open the lid 126 or otherwise disassemble the enclosure components. As provided in FIGS. 4a and 4b, vibration dampening material 128 is affixed to the interior surface of the lid 126 to reduce the noise and vibration transferred between components of the system 100 as well as outside of the system 100. However, it should be appreciated by one skilled in the art that any enclosure with or without dampening material and any arrangement of dampening material may be utilized to secure and isolate the components of the system 100 without departing from the scope of the present invention.

Figure 5:
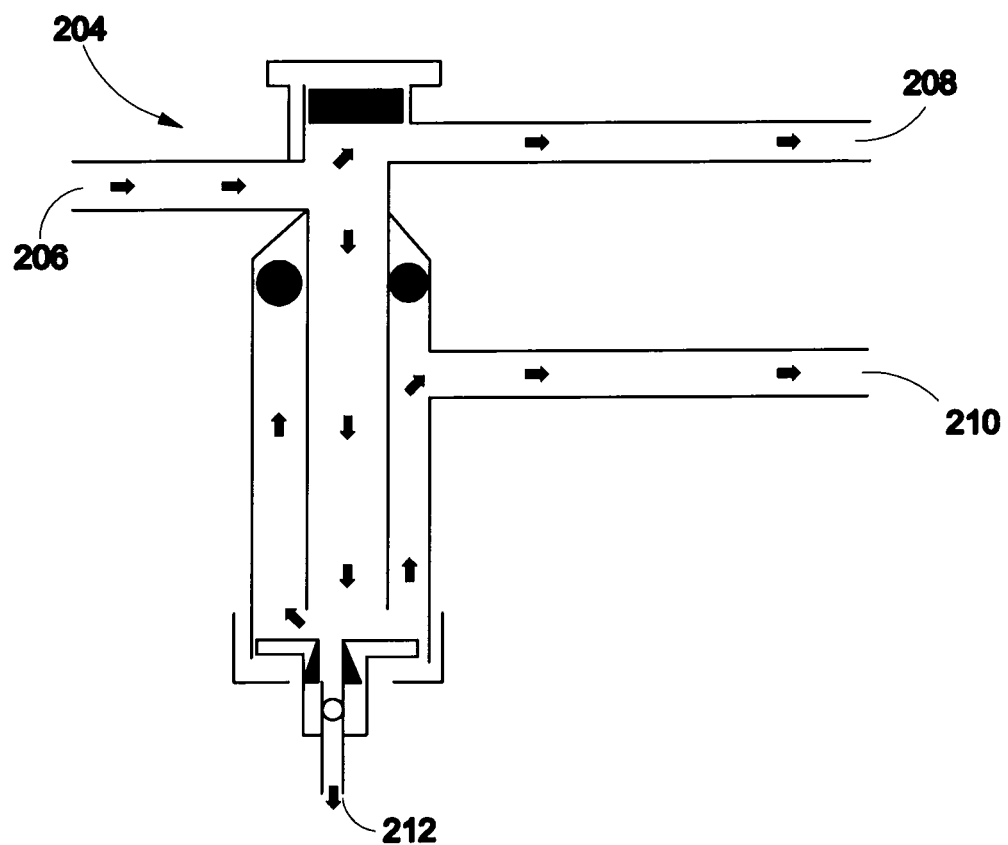
FIG. 5 is a flow diagram of a typical injector port with split vent of a gas chromatograph previously known in the art.

Turning to FIG. 5, provided is a typical injector port 204 of a gas chromatograph 200 as known in the art. Shown in the flow diagram is the flow of a gas stream through the injector port 204. The total flow through the intake port 206 is split among the various ports of the injector 204. Some of the gas total flow is lost through the septum purge port 208 while a majority of the gas total flow is lost through the split vent 210 causing only a fraction of the total gas flow to reach the column flow port 212 to be analyzed. The amount of gas lost via the split vent 210 can be as much as 99% of the total flow of gas into the intake port 206. For example, if the total flow of gas into the intake port 206 is 104.25 ml/min., the typical amount of gas lost to the septum purge port 208 may be around 3 ml/min. In contrast the typical amount of gas lost to the split vent 210 may be as high as 100 ml/min. or more, causing only 1.25 ml/min. to reach the column flow port 212. Gas lost to the septum purge port 208 and split vent 210 are typically lost to the atmosphere. The split ratio of gas lost to the split vent 210 compared to the gas used by entering the column flow port 212 is a ratio of 80 to 1. It is typical that the split ratio can be 100 to 1 meaning even more gas is lost compared to the amount of gas that actually enters the column flow port 212 to be analyzed by the gas chromatograph 200. The mitigation of the loss of this significant amount of gas is, especially the helium carrier gas which is very expensive and an expendable resource, is the goal of the present invention. As discussed above, the gas exiting the split vent 210 and/or the purge port 208 of the gas chromatograph 200 is captured by the intake of the system 100 to be filtered to produce a pure helium output gas 123 that can be recycled into the input gas stream of the gas chromatograph 200.

Figure 6:
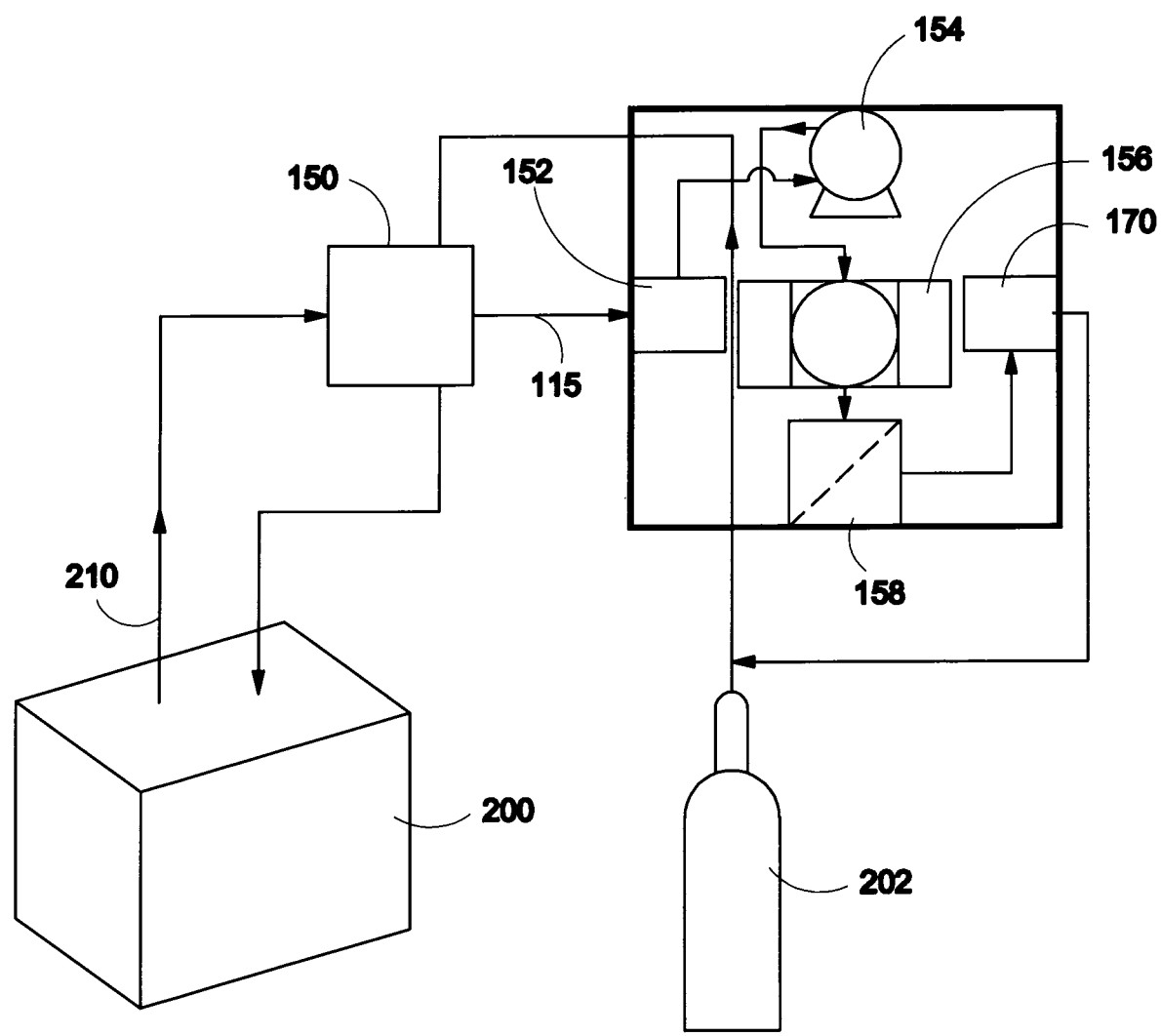
FIG. 6 is a schematic flow diagram of a helium reclamation system according to a second alternative embodiment of the present invention.

FIG. 6 provides a schematic view of a second alternative embodiment of the helium recycling system 100 of the present invention and how the components interface with the gas chromatograph 200 and the helium carrier gas source 202 for the gas chromatograph 200. Specifically, contaminated gas 103 from the split vent 210 of the gas chromatograph 200 is transferred using a plurality of tubing 115 and a flow controller or rotameter 152 and pressure controller 170 to create a pressurized 119 system 100, ideally using a pressure of 80 to 100 psi, causing the contaminated gas 103 to flow, at a constant rate, into and through the system 100. After the contaminated gas 103 enters the system 100, it is passed through an air-cooled condenser 150 to the rotameter 152 and then to a liquid cooled condenser 154. The air-cooled condenser 150 and liquid cooled condenser 154 serve some of the same function as the mini particulate filter 104 of the preferred embodiment. Specifically, they aid in the removal of moisture, water, hydrocarbons, volatile aromatic compounds, and other contaminants and particulates from the contaminated gas stream 103. The partially filtered contaminated gas stream 103 is then subjected to a and activated charcoal and/or silica gel filter 156 before being subjected to a zeolite and/or molecular sieve filter 158 to remove hydrocarbons, non-condensable and permanent gas such as oxygen, nitrogen, carbon monoxide, and carbon dioxide, as well as trace contaminants such as oxygen, water, carbon monoxide, carbon dioxide, sulfurs, halogens, alcohols, and phenols to produce a filtered helium output gas 123 that can be reintroduced to the helium source 202 for the gas chromatograph 200. It should be appreciated by one skilled in the art that any combination and/or arrangement of the aforementioned components may be utilized without departing from the scope of the present invention.

Figure 7:
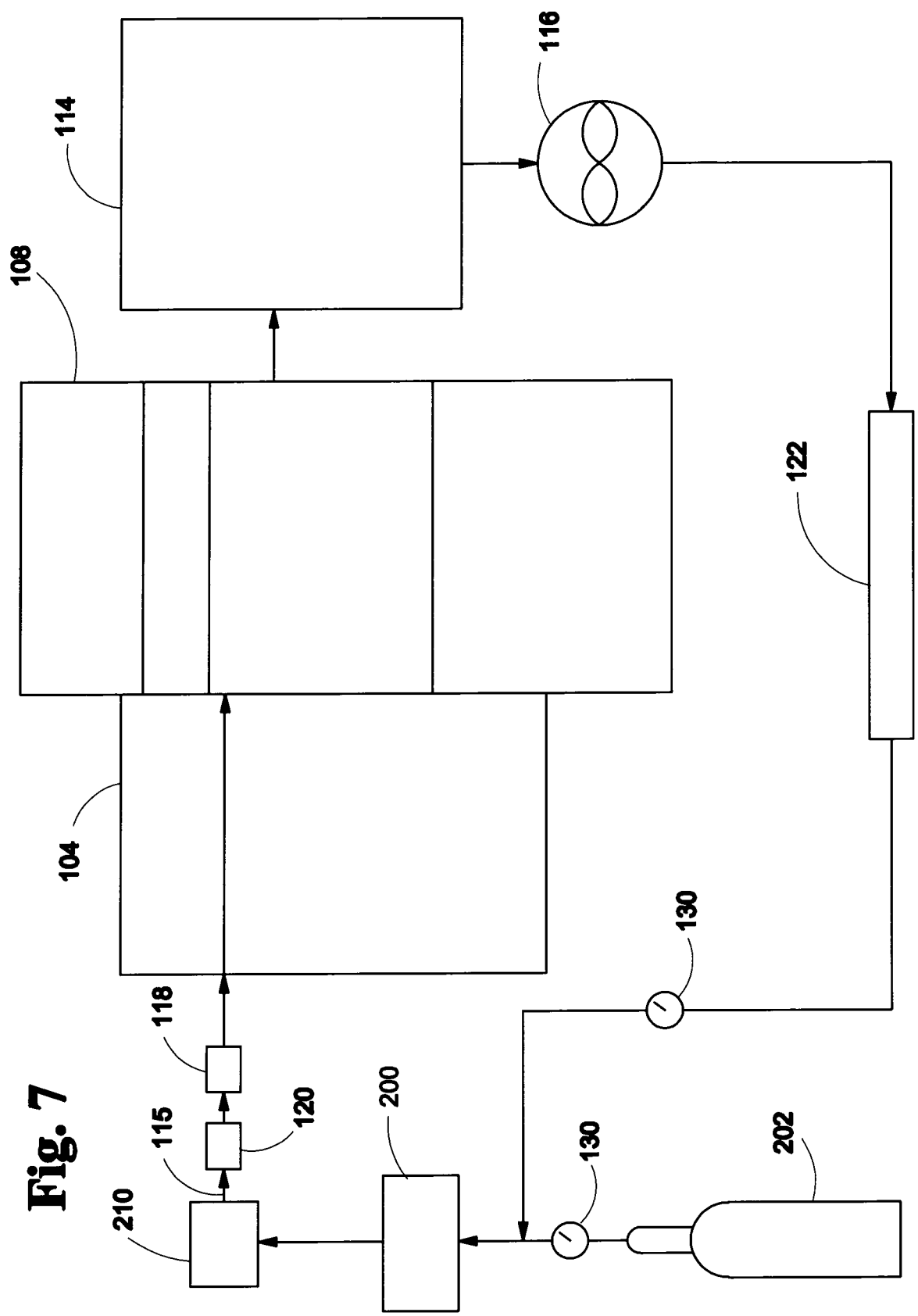
FIG. 7 is a schematic flow diagram of a helium reclamation system according to the preferred embodiment of the present invention.

Looking to FIG. 7, depicted is a schematic flow diagram of the system 100 of the preferred embodiment of the present invention. As shown, helium carrier gas flows from the helium source 202 of the gas chromatograph 200 to the split vent 210 of the gas chromatograph 200 after it is mixed with a sample to be tested by the gas chromatograph 200, thereby contaminating the original helium gas stream. Optionally, a pressure gauge 130 is utilized with the helium source 202 to monitor the pressure of the gas stream leaving the helium source 202. After the contaminated gas stream 103 leaves the split port 210 and is captured into the system 100 via a plurality of tubing 115, it is transported via pressurization 119 to a relief valve 120 and a pressure/flow controller 118, successively. Thereafter, the contaminated gas stream 103 is transported through a mini particulate filter 104. However, it should be appreciated by one skilled in the art that any filtering technology that can remove sufficient quantities of water, hydrocarbons, and/or other volatile aromatic compounds can be utilized without departing from the scope of the present invention. Thereafter, the partially filtered gas stream 103 is filtered through a molecular sieve filter 108. However, it should be appreciated by one skilled in the art that any filtering technology that can remove sufficient quantities of hydrocarbons and non-condensable and permanent gas such as oxygen, nitrogen, carbon monoxide, and/or carbon dioxide can be utilized without departing from the scope of the present invention. Subsequently, the partially filtered gas 103 is passed through a finishing filter 114 to remove any remaining trace contaminants. However, it should be appreciated by one skilled in the art that any filtering technology that can remove sufficient quantities of trace contaminates such as oxygen, water, carbon monoxide, carbon dioxide, sulfurs, halogens, alcohols, and/or phenols may be utilized without departing from the scope of the present invention. It should be appreciated by one skilled in the art that any combination and/or arrangement of the aforementioned components may be utilized without departing from the scope of the present invention.

As illustrated in FIG. 7, the flow of the contaminated gas 103 through the multi-step filtration system of the present invention is achieved by utilizing a pump 116, located after the finishing filter 114 in the preferred embodiment, and a pressure/flow controller 118, located before the mini particulate filter 104 in the preferred embodiment, that selectively activates and deactivates the pump 116 to pressurize 119 the system 100 to cause the contaminated gas 103 to flow through the system 100. The ideal pressure according to the preferred embodiment of the present invention is 80 to 100 psi. This provides sufficient pressure to ensure adequate exposure of the contaminated gas 103 to the multi-step filtration system while not creating excess pressure that can harm the system 100 and/or the gas chromatograph 200. However, it should be appreciated by one skilled in the art that any desired pressure level may be utilized without departing from the scope of the present invention. The filtered gas output made up of pure helium 123 is then transported to a pressure-rated storage cylinder 122, located after the pump 116 in the preferred embodiment of the presents invention, if the helium gas is not immediately needed. Otherwise, the helium output gas 123 travels through the pressure-rated storage cylinder 122 back into the carrier gas input stream of the gas chromatograph 200. Moreover, the system also includes a relief valve 120, located after the contaminated gas stream 103 enters the system 100 and before the pressure/flow controller 118 in the preferred embodiment of the present invention. The relief valve 120 allows the system 100 to vent excess pressure and/or gas to prevent back flow pressure from entering the gas chromatograph 200. This is needed since back pressure can severely damage the sensitive machinery of the gas chromatograph 200. Optionally, a pressure gauge 130 is placed within the system 100 to allow a user to monitor the pressure level of the system 100. It should be appreciated by one skilled in the art that any combination and/or arrangement of the aforementioned components may be utilized without departing from the scope of the present invention.

Figure 8:
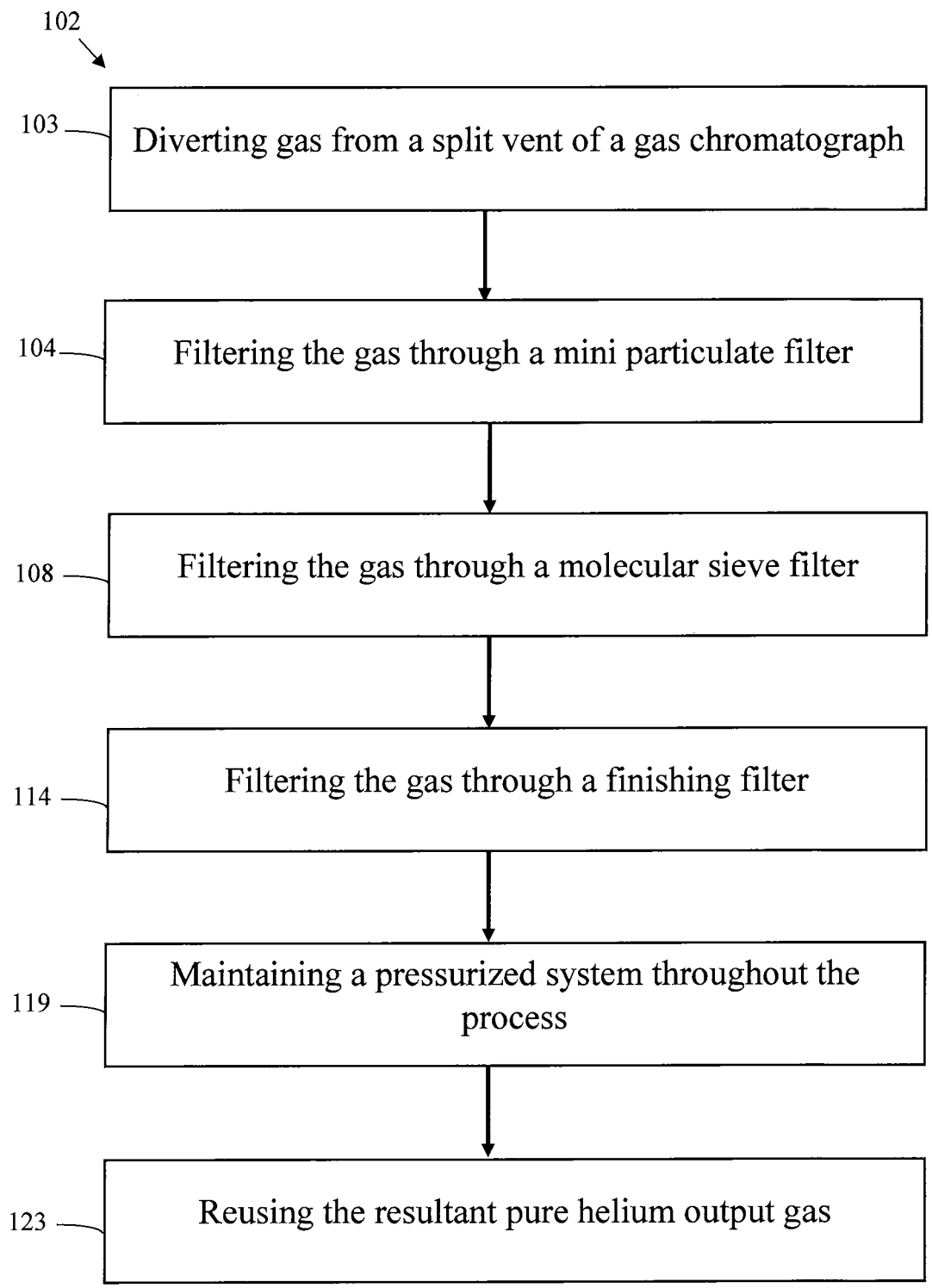
FIG. 8 is a flow chart of a helium reclamation process according to the preferred embodiment of the method of the present invention.

With respect to FIG. 8, provided is a flow chart of the helium reclamation process of the present invention. As provided, contaminated gas 103 enters the process 102 after being diverted from a split vent 210 of a gas chromatograph 200. Thereafter, the contaminated gas 103 is filtered through a mini particulate filter 104 that removes water, hydrocarbons, and/or other volatile aromatic compounds. Next, the contaminated gas 103 is filtered through a molecular sieve filter 108 to remove hydrocarbons and non-condensable and permanent gas such as oxygen, nitrogen, carbon monoxide, and/or carbon dioxide. Finally, the contaminated gas 103 is filtered through a finishing filter 114 to remove any remaining trace contaminates such as oxygen, water, carbon monoxide, carbon dioxide, sulfurs, halogens, alcohols, and/or phenols. The flow of the contaminated gas 103 through the process 102 is achieved by utilizing and maintaining a pressurized system 119. However, it should be appreciated by one skilled in the art that any multi-step filtering process that removes the above identified contaminates and any technology to create a constant flow rate of the contaminated gas 103 through the process 102 may be utilized without departing from the scope of the present invention. The resulting pure helium output gas 123 may be reused with a gas chromatograph 200 or stored for later use in a storage medium 122.

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g. attached, adhered, joined) are to be construed broadly and may include intermediate members between a connection of elements and relative movement between elements. As such, joinder references do not necessarily infer that two elements are directly connected and in fixed relation to each other. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to the embodiments outlined above, various alternatives, modifications, variations, improvements and/or substantial equivalents, whether known or that are or may be presently foreseen, may become apparent to those having at least ordinary skill in the art. Listing the steps of a method in a certain order does not constitute any limitation on the order of the steps of the method. Accordingly, the embodiments of the invention set forth above are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements, and/or substantial equivalents.

The invention claimed is:

1. A helium recycling system for a gas chromatograph comprising:
   a. an intake contaminated gas stream from at least a split vent of said gas chromatograph entering a plurality of tubing;
   b. wherein said intake contaminated gas stream is pressurized at 80-100 psi;
   c. said intake contaminated gas stream exposed to a multi-step filtration system through said plurality of tubing to produce a pure helium output gas stream; and
   d. wherein said pure helium output gas stream is transported to at least one of an input gas stream of said gas chromatograph and a storage medium.

2. The helium recycling system of claim 1 wherein said multi-step filtration system comprises at least two of a mini particulate filter, a molecular sieve filter, and a finishing filter.

3. The helium recycling system of claim 1 further comprising a relief valve connected to said plurality of tubing.

4. The helium recycling system of claim 1 further comprising a pump and a controller connected to said system through said plurality of tubing to pressurize said system wherein said controller selectively activates and deactivates said pump to create, monitor, and maintain a pressure level to create a flow rate of gas through said helium recycling system.

5. The helium recycling system of claim 1 wherein said storage medium comprises a pressure-rated storage cylinder to store said helium output gas.

6. The helium recycling system of claim 2 wherein said mini particulate filter comprises one or more filter members to filter said intake contaminated gas stream by removing gases selected from the group consisting of:
   a. water;
   b. hydrocarbons;
   c. volatile aromatic compounds; and
   d. combinations thereof.

7. The helium recycling system of claim 2 wherein said molecular sieve filter comprises at least one three or four angstrom pore.

8. The helium recycling system of claim 2 wherein said molecular sieve filter comprises a three angstrom pore and a four angstrom pore.

9. The helium recycling system of claim 2 wherein said molecular sieve filter removes at least one of non-condensable gas and permanent gas from said intake contaminated gas stream selected from the group consisting of:
   a. oxygen;
   b. nitrogen;
   c. carbon monoxide;
   d. carbon dioxide; and
   e. combinations thereof.

10. The helium recycling system of claim 2 wherein said finishing filter comprises at least one of a molecular sieve filter, an activated alumina filter, an activated carbon filter, and a zinc oxide filter.

11. The helium recycling system of claim 2 wherein said finishing filter removes trace contaminants selected from the group consisting of:
   a. oxygen;
   b. water;
   c. carbon monoxide;
   d. carbon dioxide;
   e. sulfurs;
   f. halogens;
   g. alcohols;
   h. phenols; and
   i. combinations thereof.

12. The helium recycling system of claim 2 wherein said mini particulate filter removes contaminants into a removably attached, substantially transparent collection chamber.

13. The helium recycling system of claim 2 wherein said molecular sieve filter further comprises removably attached end caps.

14. The helium recycling system of claim 2 wherein said finishing filter further comprises color changing indicators to indicate filter saturation.

15. A helium recycling process for a gas chromatograph comprising:
   a. diverting at least a portion of a gas stream from a split vent of said gas chromatograph;
   b. filtering said gas stream through a mini particulate filter;
   c. filtering said gas stream through a molecular sieve filter;
   d. filtering said gas stream through a finishing filter;
   e. maintaining a pressurized system throughout said recycling process at 80-100 psi; and
   f. reusing a resultant pure helium output gas.

16. The helium recycling process of claim 15 further comprising storing said resultant pure helium output gas in at least one storage medium.

17. The helium recycling process of claim 15 wherein said mini particulate filter filters said gas stream by removing gases selected from the group consisting of:
   a. water;
   b. hydrocarbons;
   c. volatile aromatic compounds; and
   d. combinations thereof.

18. The helium recycling process of claim 15 wherein said molecular sieve filter filters said gas stream by removing gases selected from the group consisting of:
   a. oxygen;
   b. nitrogen;
   c. carbon monoxide;
   d. carbon dioxide; and
   e. combinations thereof.

19. The helium recycling process of claim 15 wherein said finishing filter filters said gas stream by removing gases selected from the group consisting of:
   a. oxygen;
   b. water;
   c. carbon monoxide;
   d. carbon dioxide;
   e. sulfurs;
   f. halogens;
   g. alcohols;
   h. phenols; and
   i. combinations thereof.

20. A method of reclaiming helium from a gas chromatograph comprising:
   a. diverting at least a portion of contaminated gas from at least a split vent of said gas chromatograph via a plurality of tubing;
   b. subjecting said contaminated gas to pressurization by utilizing a pump and a controller to maintain a constant flow rate of said contaminated gas;
   c. wherein said controller selectively activates and deactivates said pump to create, monitor, and maintain a pressure level between 80 and 100 psi;
   d. said contaminated gas filtered through a mini particulate filter through said plurality of tubing;

e. wherein said mini particulate filter comprises one or more filter members to remove gases selected from the group consisting of: water; hydrocarbons; volatile aromatic compounds; and combinations thereof,
f. thereafter, said contaminated gas filtered through a molecular sieve filter, comprising removable end caps and a filter member comprising at least one pore three or four angstrom in size, through said plurality of tubing;
g. wherein said molecular sieve filter removes at least one of non-condensable gas and permanent gas selected from the group consisting of: oxygen; nitrogen; carbon monoxide; carbon dioxide; and combinations thereof,
h. thereafter, said contaminated gas filtered through a finishing filter, comprising indicators to indicate filter saturation and at least one filter member selected from the group consisting of: a molecular sieve filter; an activated alumina filter; an activated carbon filter; a zinc oxide filter; and combinations thereof, through said plurality of tubing to produce a pure helium output gas;
i. wherein said finishing filter removes trace contaminants selected from the group consisting of: oxygen; water; carbon monoxide; carbon dioxide; sulfurs; halogens; alcohols; phenols; and combinations thereof; and
j. wherein said pure helium output gas stream is transported to an input gas stream of said gas chromatograph or to a storage medium connected to said plurality of tubing.

\* \* \* \* \*